Patented July 22, 1924.

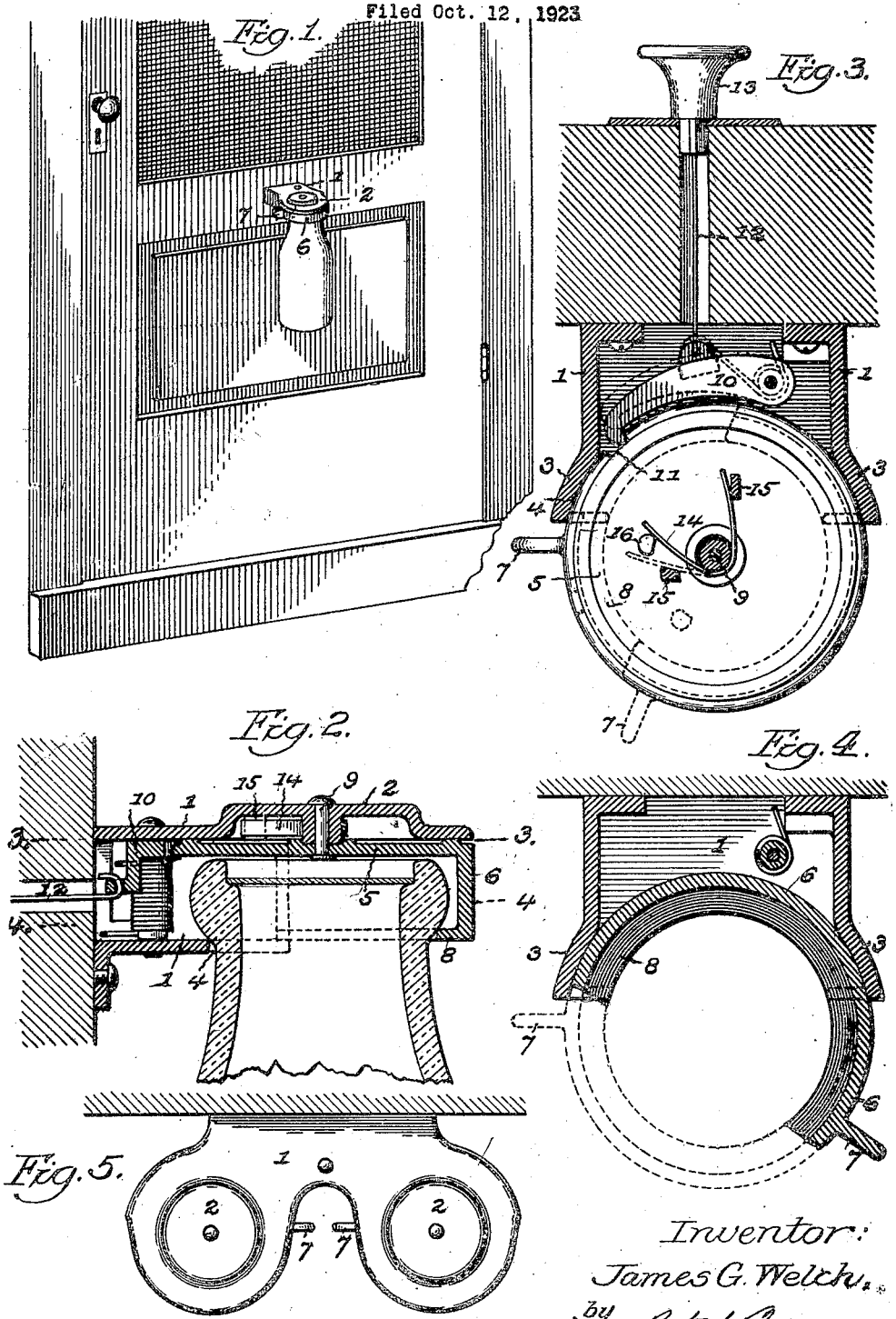

1,502,322

UNITED STATES PATENT OFFICE.

JAMES G. WELCH, OF NORTH CHICAGO, ILLINOIS, ASSIGNOR TO WELCH BROTHERS COMPANY, OF NORTH CHICAGO, ILLINOIS, A CORPORATION OF ILLINOIS.

MILK-BOTTLE HOLDER.

Application filed October 12, 1923. Serial No. 668,067.

*To all whom it may concern:*

Be it known that I, JAMES G. WELCH, a citizen of the United States of America, residing at North Chicago, in the county of Lake and State of Illinois, have invented certain new and useful Improvements in Milk-Bottle Holders, of which the following is a specification.

This invention relates to that type of milk bottle holders in which the milk bottle, after proper delivery by a milk driver, is held by its neck in the holder and in a locked condition against unauthorized removal. And the present improvements have as their objects.

To provide a structural formation and association of parts whereby an easy insertion of the neck of the bottle into place in the holder, with a subsequent substantial locking of the holder parts around the bottle neck, until released by the parties for whom the delivery is intended, all as will hereinafter more fully appear.

In the accompanying drawing:

Fig. 1, is a perspective view showing the holder in place upon the door of a dwelling.

Fig. 2, is a central longitudinal sectional elevation.

Fig. 3, is a horizontal section on line 3—3, Fig. 2.

Fig. 4, is a similar view on line 4—4, Fig. 2.

Fig. 5, is a plan view of a holder of the multiple type. Like reference numerals indicate like parts in the different views.

In the present improvement the main or fixed portion of the holder comprises an open front rectangular shell or casing 1 provided with means for fixed attachment to a door or other convenient part of a dwelling house, and having on its top web a horizontal forward extension 2, preferably of a circular form with the central part thereof dished upwardly to provide a receiving cavity for the hereinafter described spring of the device. At its sides the casing 1 is formed with outwardly flared webs or cheek plates 3 adapted for close association with the side walls of the hereinafter described movable member of the device, while the front edge of the bottom web of the casing 1 is flared to correspond with said cheek plates 3 and is formed with a segmental recess 4 adapted to provide a holding fit against the neck of a bottle underneath the expanded marginal rim of the same.

The movable member of the device comprises a circular shell having a closed top web 5, and a depending semi-circular side wall 6, formed with an operating finger piece 7 and with a semi-circular inturned holding flange 8 adapted for a holding fit against the neck of a milk bottle in opposed relation to the segmental recess 4 of the casing 1, to provide a substantial holding and supporting engagement with a milk bottle in place between the parts.

In the particular construction shown, a pivot pin or stud 9 passes through the central portion of the extension 2 of the main casing 1 and through the top web 5 of the movable shell to revolubly connect the parts together, with the semi-circular side wall 5 of the movable shell moving inside and in close relation to the cheek plates 3 of the fixed casing 1.

With the device in its open condition, the semi-circular wall 5 and flange 6 of the movable member are within the cavity of the fixed casing 1, and affords easy and convenient insertion of a milk bottle into the holder. With a semi-rotation of said movable member its semi-circular wall 5 and flange 6 are moved to the front of the holder and in connection with the segmental recess 4 in the bottom web of the casing 1 provides a circular supporting ledge in engagement with the bottle neck to hold the same securely in place until released by a movement of said movable member to the open condition above described.

The movable member is locked in the closed condition above described by a spring pawl 10 the detent of which is adapted to engage in a notch 11 in the top plate 5 of the movable member of the holder as shown in Fig. 3. The spring pawl 10 is arranged within the closed cavity of the casing 1, and is only capable of being released from the described engagement by means incapable of operation by unauthorized persons. In the construction shown in Fig. 3, the release movement of the pawl 10 is effected by a pull rod 12 extending inward through a door or other support and provided with an operating knob 13 on its inner end.

In order to attain a movement of the movable member from its closed position when released from engagement with the spring pawl 10, a spring 14 tending to so move the movable member is provided between the same and the fixed casing 1 of the device. In the construction shown in Figs. 2 and 3, a U shape spring 14 is held in place on the underside of the extension 5 of the main casing 1 by the hub of the pivot pin 9 and a pair of spaced lugs 15, 15 depending from said extension. In connection therewith an eccentrically arranged lug 16 on the top plate 5 of the movable member, is adapted in a final closing of said movable member to contact with one end of the spring 14 and compress the same. With the spring pawl 10 in holding engagement with the notch 11 of the movable member, the spring 14 is held in the described compressed condition, until such time as said pawl is moved to a release, when the resiliency of the spring will turn the movable member into a partly open condition ready for complete opening and removal of the bottle from the holder.

Having thus fully described my invention what I claim as new and desire to secure by Letters Patent, is:—

1. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, and means within said fixed shell for locking the semi-rotary member in a bottle engaging condition.

2. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, means within said fixed shell for locking the semi-rotary member in a bottle engaging condition, and a spring tending to force said semi-rotary member out of its locked position.

3. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, a spring pawl arranged within said fixed shell and having engagement in a holding notch in the semi-rotary member, and means for operating said pawl to a release.

4. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, a spring pawl arranged within the fixed shell and having engagement in a holding notch in the semi-rotary member, means for operating said pawl to a release, and a spring tending to force said semi-rotary member out of its locked position.

5. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, a spring pawl arranged within the fixed shell and having engagement in a holding notch in the semi-rotary member, and means for operating said pawl to a release, the same comprising a handled pull rod extending through the supporting means of the appliance, and accessible only to a party inside said supporting means.

6. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, a spring pawl arranged within the fixed shell and having engagement in a holding notch in the semi-rotary member, means for operating said pawl to a release, the same comprising a handled pull rod extending through the supporting means of the appliance, and a spring tending to force said semi-rotary member out of its locked position.

7. In a bottle holder, the combination of a fixed open front shell having a closed top web, a bottom web formed with a receiving recess at front and side webs having flared cheek portions, a semi-rotary member pivoted to the top web of the aforesaid fixed shell and having a depending semi-circular wall carrying at its lower end an inturned flange, and means within said fixed shell for locking the semi-rotary member in a bottle engaging condition.

8. In a bottle holder, the combination of a fixed open front shell having a closed top web and bottom web formed with a receiving recess at front, a semi-rotary member pivoted to the top web of the aforesaid fixed shell and having a depending semi-circular wall carrying at its lower end an inturned flange, means within said fixed shell for locking the semi-rotary member in a bottle engaging condition, and a U-shaped spring supported on the underside of the top web of the fixed shell and adapted for compression, and a lug on the semi-rotary member adapted to have compressive engagement with said spring.

Signed at North Chicago, Illinois, this 9th day of October, 1923.

JAMES G. WELCH.